United States Patent [19]

Mouille

[11] 4,304,525
[45] Dec. 8, 1981

[54] HELICOPTER ROTOR

[75] Inventor: René L. Mouille, Aix-en-Provence, France

[73] Assignee: Societe Nationale Industrielle Aerospatiale, France

[21] Appl. No.: 43,878

[22] Filed: May 30, 1979

[30] Foreign Application Priority Data

Jun. 2, 1978 [FR] France ............................. 78 16521
May 8, 1979 [FR] France ............................. 79 11585

[51] Int. Cl.³ ............................................. B64C 27/38
[52] U.S. Cl. ................................ 416/134 A; 416/140; 416/141
[58] Field of Search .............. 416/107, 140 A, 134 A, 416/138 A, 138 R, 141

[56] References Cited

U.S. PATENT DOCUMENTS

| 2,815,821 | 12/1957 | Echeverria | 416/140 A |
| 3,282,350 | 11/1966 | Kisovec | 416/140 A |
| 3,310,119 | 3/1967 | Watson | 416/159 |
| 3,758,230 | 9/1973 | Potter | 416/140 A X |
| 3,761,199 | 9/1973 | Ferris et al. | 416/134 A |
| 3,923,419 | 12/1975 | Mouille | 416/140 A X |
| 3,932,059 | 1/1976 | Rybicki | 416/140 A |
| 4,028,001 | 6/1977 | Watson | 416/134 A |
| 4,105,365 | 8/1978 | Ferris et al. | 416/140 A |
| 4,178,130 | 12/1979 | Ferris et al. | 415/140 A |

FOREIGN PATENT DOCUMENTS 64797 5/1977 Japan ............................. 416/134 A Primary Examiner—Everette A. Powell, Jr.
Attorney, Agent, or Firm—Karl W. Flocks; A. Fred Starobin

[57] ABSTRACT

Rotary-wing aircraft rotor comprising a rigid hub coupled to the root of each blade in which a trailing return brace comprises a stack of metal plates alternating with plates of visco-elastic material the ends of which being coupled via a ball joint respectively to the root of one blade and to a place of the hub such that the brace is always slightly inclined.

9 Claims, 13 Drawing Figures

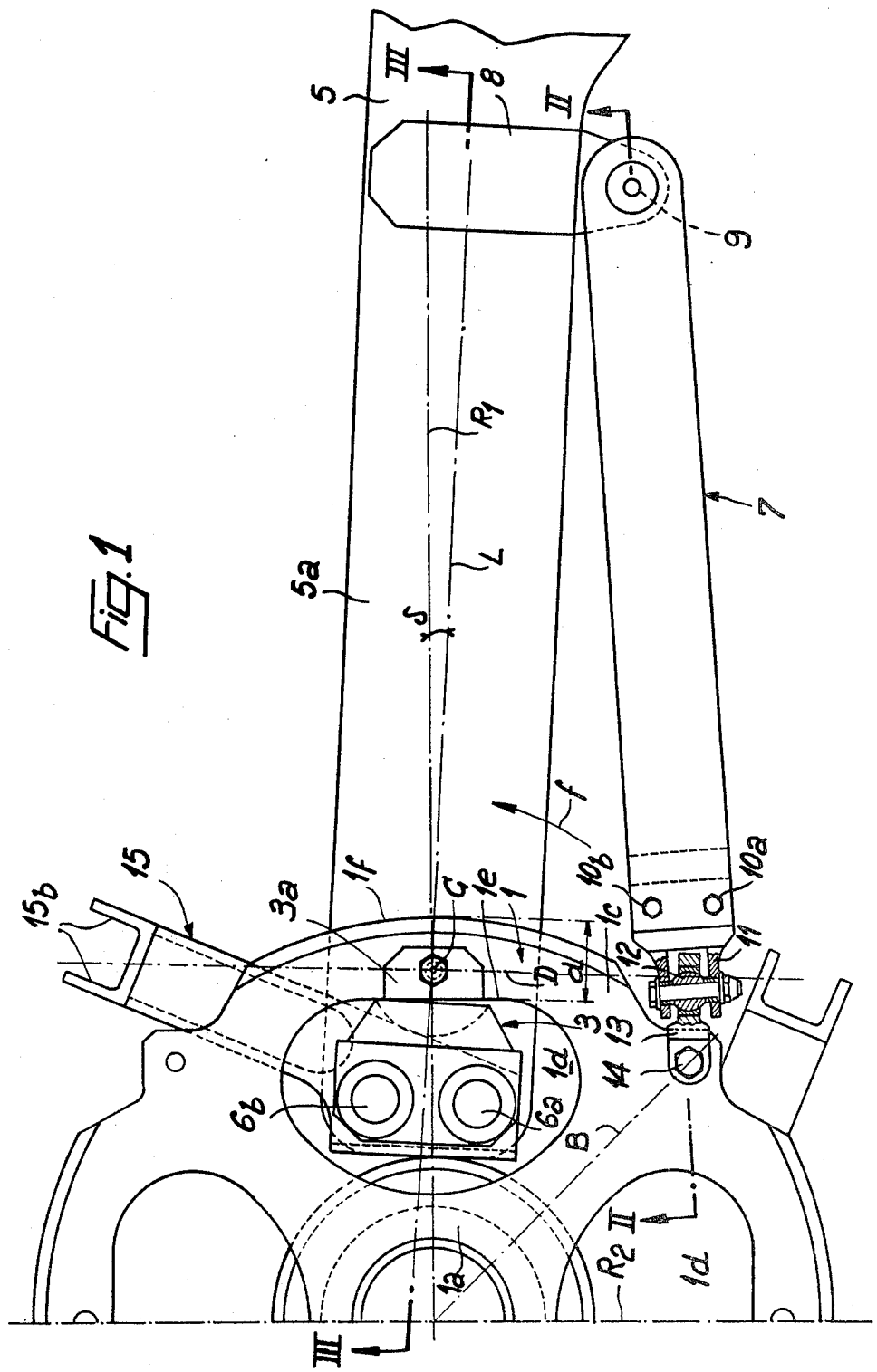

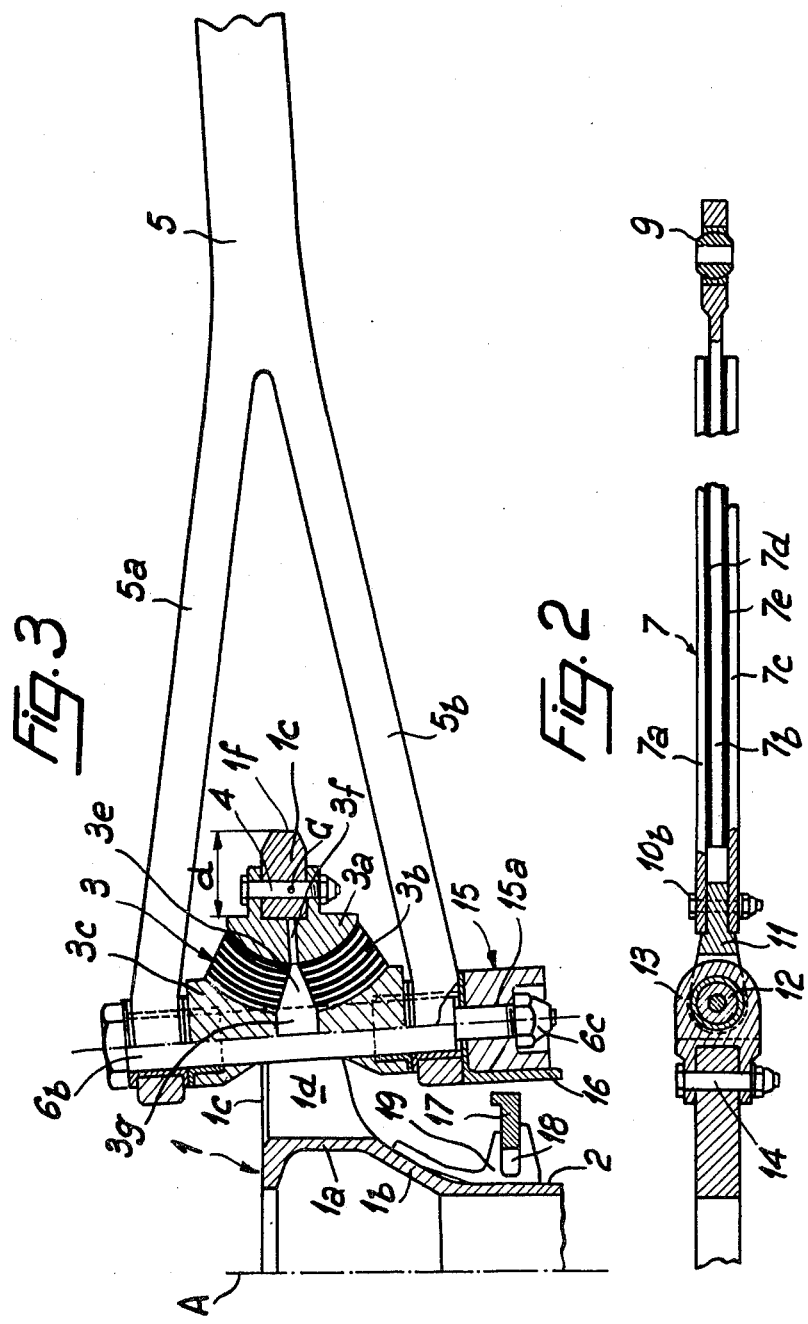

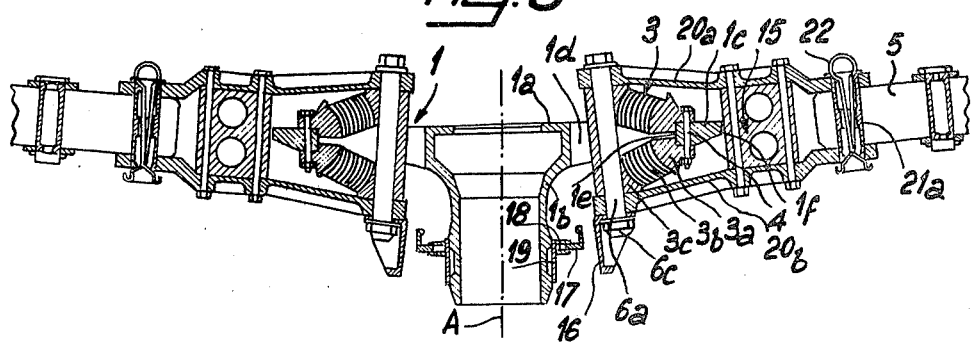
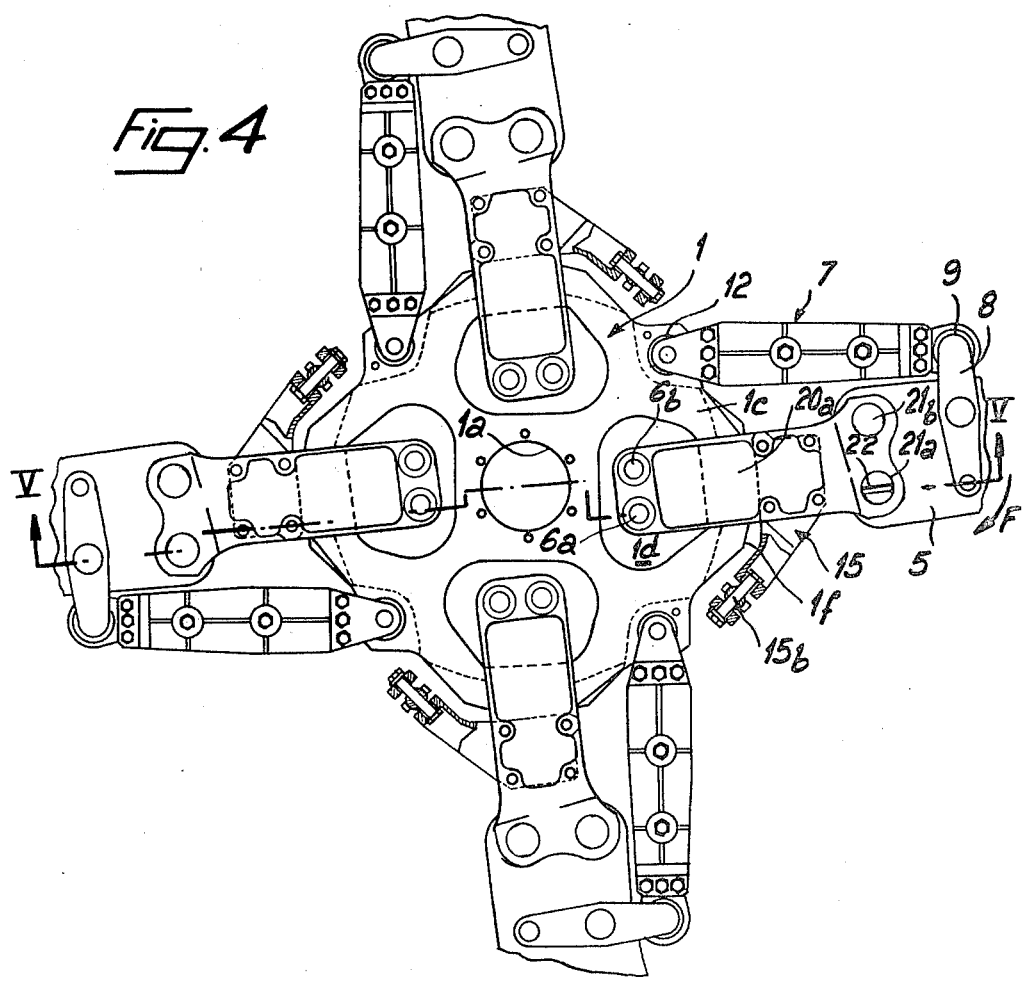

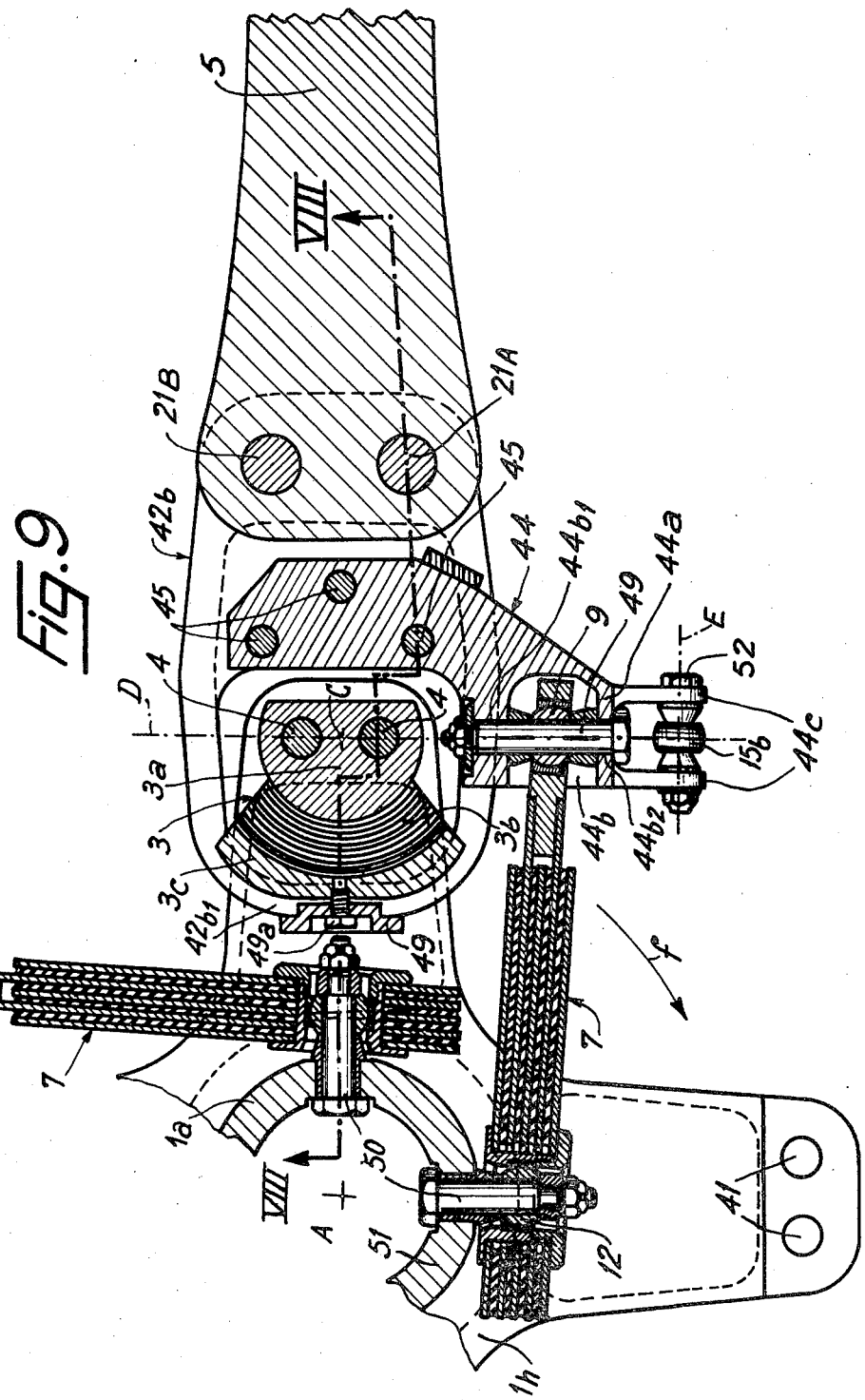

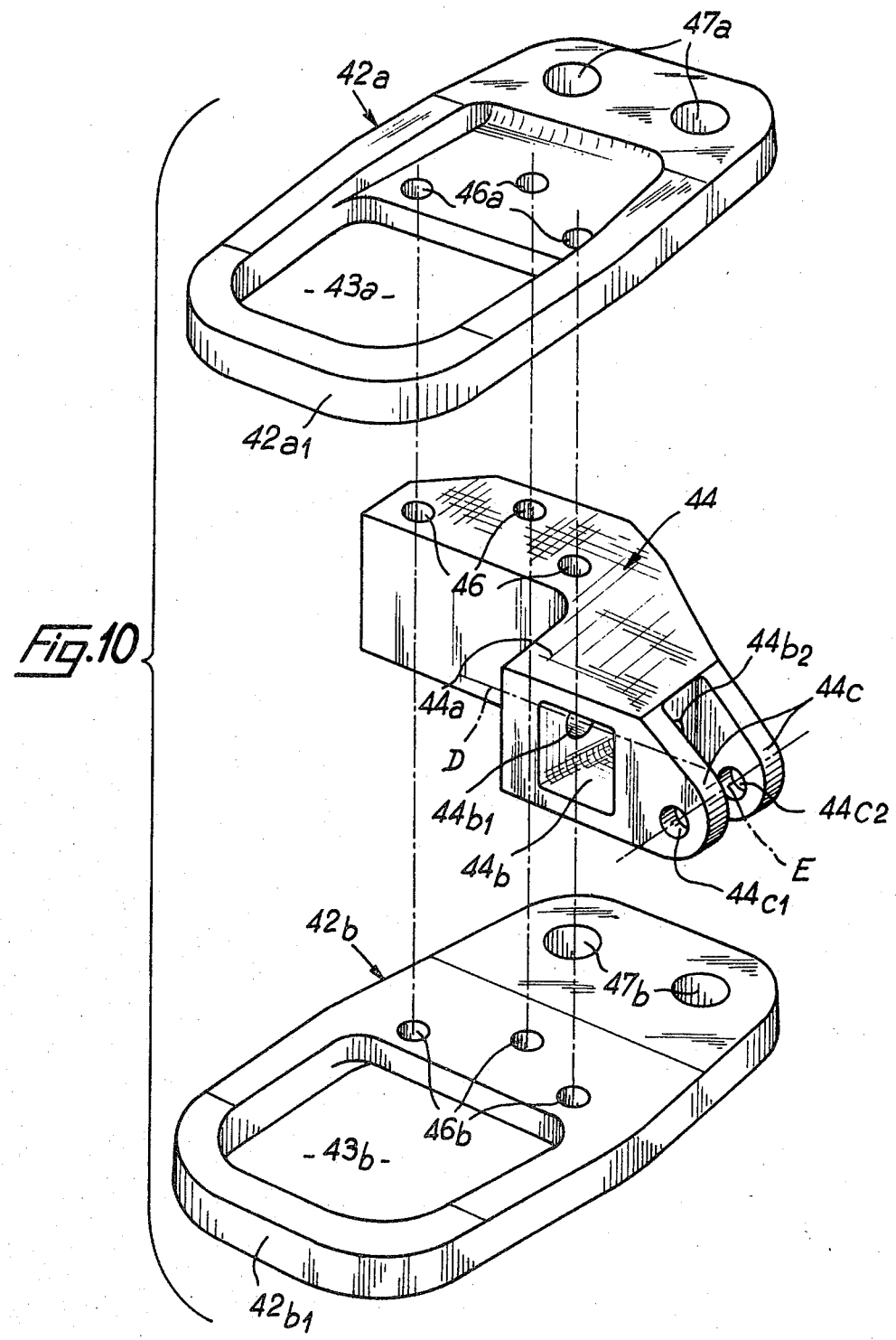

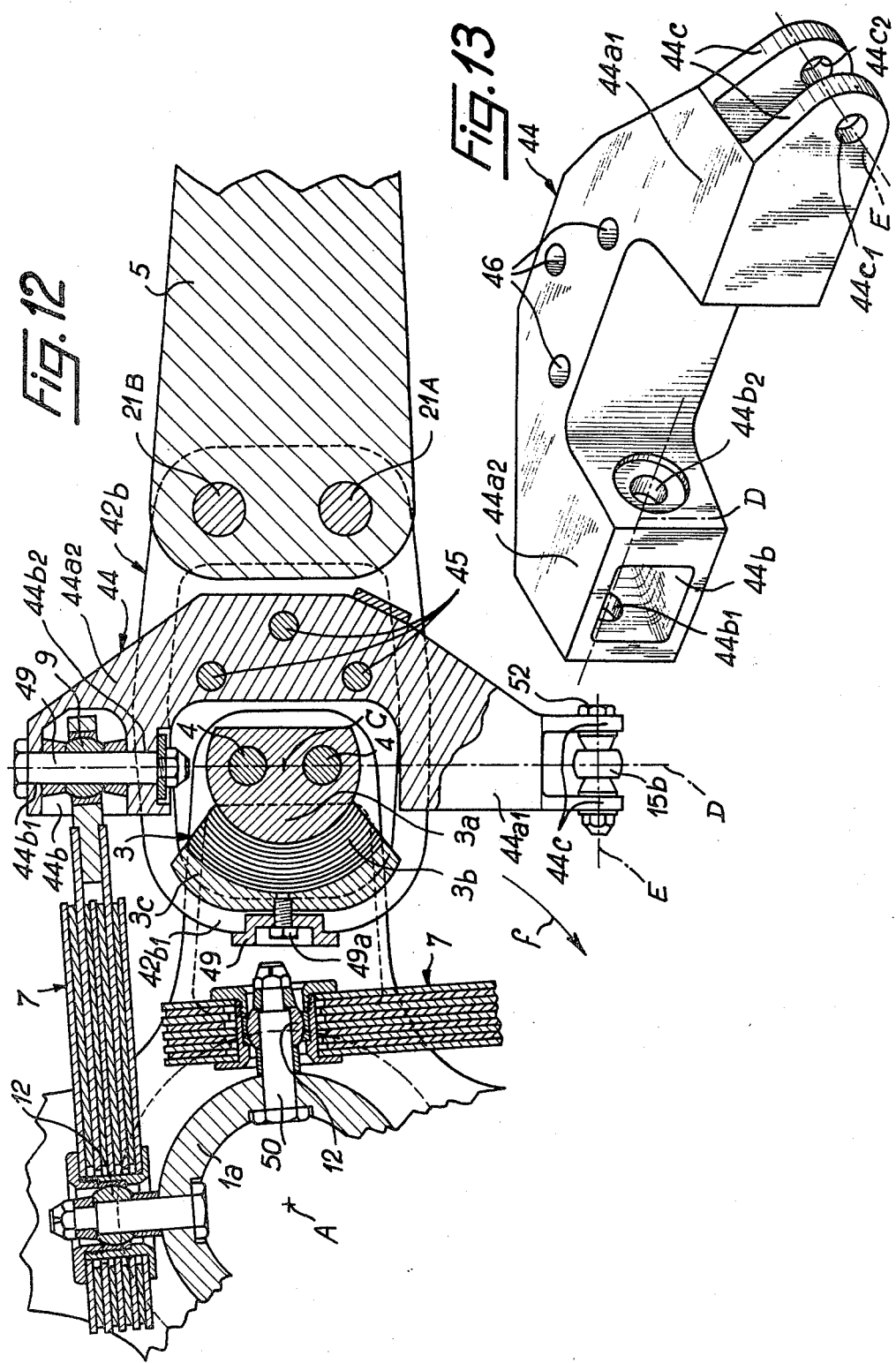

HELICOPTER ROTOR

The invention relates to a rotary-wing aircraft rotor comprising a rigid hub to which the root of each blade is coupled by means of a laminated spherical abutment and a resilient trailing return brace.

French Patent Specification No. 73.25319 published on Feb. 1, 1974 describes a rotary-wing aircraft rotor having a completely rigid hub having a number of radial tubular arms equal to the number of blades; the root of each blade engages inside the corresponding tubular arm, to which it is coupled inter alia by a spherical abutment, which likewise is inside the radial arm; a hydraulic or pneumatic drag shock-absorber has one end connected by a ball joint to the foot of the blade in question inside the corresponding tubular arm and the other end connected by a ball joint to a place on the outside of the radial arm associated with an adjacent blade; to this end the shock-absorber rod must extend through a wide aperture in the base of the wall of the tubular arm associated with the blade in question, the aperture being fitted with sealing means. The hub has numerous disadvantages. Its radial tubular arms are subjected to bending and tensile stresses, the latter due to centrifugal force acting on the blades, and must have relatively thick walls, which considerably increases the weight of the rotor assembly. Manufacture is expensive owing to its complicated structure (complicated mould, numerous machining and inter alia finishing operations). The aperture required in the wall of each tubular arm for the corresponding shock-absorber rod greatly reduces the fatigue strength of the arm, when subjected to considerable dynamic stresses. When the rotor starts and stops, the blades are not brought to their neutral position corresponding to a zero angle of drag, since the shock-absorbers do not exert any resilient return force on the blades. Likewise, the range of spring movement of each trailing blade is not limited until the piston of the corresponding shock-absorber abuts the end of its cylinder. Consequently the known rotor blades can occupy a wide variety of positions when the rotor starts or stops. This may result in a considerable unbalance during the aforementioned phases of operation, thus exciting the rotary-wing aircraft assembly at the rotation frequency of the rotor. The result may be a resonance phenomenon peculiar to rotary-wing aircraft and known as "ground resonance", which may seriously damage the aircraft before take-off or after landing.

U.S. Pat. No. 4,028,001 of Kenneth Watson, issued June 7, 1977 and entitled "Rotor For Rotary Wing Aircraft", likewise describes a rotary-wing aircraft rotor comprising a completely rigid hub which, as before, has a number of radial arms equal to the number of blades. Each radial arm has an internal cavity opening from both sides of the arm so that a U-shaped component can be inserted into the cavity, the outer arms of the U being secured to a sleeve attached to the corresponding blade root; the U-shaped component is coupled to the corresponding arm of the hub inter alia by a spherical abutment, likewise mounted in the arm cavity; elastomeric drag shock-absorbers each have one end coupled to the sleeve connected to one blade root and the other end secured by a ball-joint link to the central part of the hub, thus securing the hub to the rotor strut. Consequently the last-mentioned shock-absorbing device is complicated, heavy and expensive. Owing to its structure, the known rotor hub must be considerably thicker than each blade in the direction of the rotor axis, so that the hub is inevitably heavy, plus the weight of the U-shaped components and sleeves secured thereto. Owing to its complex structure, the known hub is also very expensive to manufacture.

U.S. Pat. No. 3,923,419 of Rene Louis Mouille, issued Dec. 2, 1975 and entitled "Damped Elastic Tie Device Between Rotor Blade and Hub on Rotary-Wing Aircraft", describes a resilient shock-absorbing connecting device between a rotary-wing aircraft rotor blade and the rotor hub. One embodiment of the device comprises a resilient component and a shock-absorbing component combined in the form of at least one set of parallel metal plates between which there are layers of a viscoelastic material having high rigidity and persistence of deformation. However, the last-mentioned connecting device is applied to a rotor having a hub provided with arms to which the blade roots are coupled by purely mechanical trailing joints.

The rotary-wing aircraft rotor according to the invention is of the previously-described kind but does not have any of the aforementioned disadvantages of the known rotors.

The rotor according to the invention is characterised in that trailing return braces each comprise a stack of metal plates alternating with plates of visco-elastic material having great persistence of deformation and form frequency adapters, one end of each brace being coupled via a ball-joint to the root of one blade and the other end being coupled by a ball-joint to a place on the hub such that the brace is always slightly inclined to the corresponding blade and the centre of one ball joint is near the beat axis of the blade, which extends through the centre of the corresponding laminated spherical abutment.

In a first embodiment of the rotor according to the invention, the peripheral part of its hub is a flat ring having a convex polygonal or substantially circular periphery and formed in the direction of the rotor axis with a number of apertures equal to the number of blades, each laminated spherical abutment is mounted between the outer edge of one such aperture and the ends of the arms of a forked component secured to the corresponding blade root, and the second end of each trailing return brace is coupled via a ball joint to a place on the hub periphery between a laminated spherical abutment associated with the blade in question and the abutment associated with the immediately preceding or following blade in the direction of rotation of the rotor.

The rotor hub according to the invention comprises a flat annular peripheral part to which the blade roots are coupled inter alia by forked members co-operating with the corresponding spherical abutments via apertures in the peripheral part of the hub, the apertures extending in the direction of the rotor axis. Consequently the flat annular peripheral part of the hub, in the direction of the rotor axis, can be considerably thinner than each blade. Furthermore, since the rotor hub according to the invention does not have thick-walled radial tubular arms, it can be much lighter than prior-art rotor hubs of the same kind. Owing to its simple structure, the rotor hub according to the invention can be cheaper to manufacture. Since each rotor blade according to the invention is coupled by a resilient return brace of the previously-described kind, the plates of visco-elastic material subject it to a considerable return force towards its neutral position corresponding to a zero angle of drag. Consequently, when the rotor according to the invention starts and stops, all its blades are in their respective neutral positions, thus reliably preventing an appreciable unbalance which can give rise to the dangerous phenomenon called "ground resonance".

In addition, the resilient return braces act as adapters of the natural drag frequencies, since, owing to their resilient properties, they can be used to adjust the frequency of the first natural mode of drag vibration of each blade to a value sufficiently below the frequency corresponding to the rated rotation speed to prevent any risk of resonance when the rotor rotates at normal speed, but sufficiently high to eliminate the problems of ground resonance.

Finally, owing to the great persistence of deformation in the elastomeric material forming the visco-elastic shock-absorbing components of the braces, the motion of the trailing blades is greatly reduced, more particularly when the rotor starts or stops, when the rotation speed passes through the value corresponding to the natural frequency of the first vibration mode of the trailing blades. This eliminates any risk of resonance phenomena.

Other known rotary-wing aircraft rotors have a substantially rigid central part of the hub formed in the direction of the rotor axis with a number of apertures equal to the number of blades, a spherical abutment also being mounted between the outer edge of each aperture and the ends of the arms of a forked component secured to the corresponding blade root. However, the last-mentioned known rotor hubs comprise an outer star-shaped part having a connecting arm for each blade, the arm being flattened in the plane of the star and flexible in the direction perpendicular thereto. Consequently, a star-shaped hub of the aforementioned kind has a much greater diameter than the rotor hub according to the invention, which has a convex polygonal or circular periphery. As a result, the known hub has a greater drag, other things being equal, than the rotor according to the invention, so that the latter uses energy much more efficiently. At a given fuel consumption, a helicopter equipped with a rotor according to the invention can reach a speed greater by about 2% in the case of a light aircraft and about 5% in a heavier aircraft. Furthermore, owing to their great flexibility, the flexible arms of the known rotors can cause difficulty during starting and stopping of the rotor in a high wind. Since the rotor hub according to the invention has a considerably reduced diameter, the blade roots can be secured near the rotor axis, thus further reducing the drag of the rotor according to the invention and facilitating streamlining thereof, for the same purpose. Owing to its reduced diameter and the absence of arms, the rotor hub according to the invention can be considerably lighter than a comparable star-shaped hub. The rotor hub according to the invention is also much simpler and therefore cheaper to manufacture than a star-shaped hub. Finally, owing to the absence of a flexible arm, there is a considerable reduction in the eccentricity of the beat of the blades and, other things being equal, the rotor control power is reduced by about 25% compared with a star-shaped rotor, resulting in a considerable reduction in the vibratory excitation of the rotor according to the invention.

In a preferred embodiment of the rotor according to the invention, the forked component coupling each blade root to the corresponding spherical abutment is a prolongation of the blade root, the end of the arms being secured, e.g. by two bolts, to the holder of the laminated spherical abutment. The last-mentioned embodiment is particularly advantageous in that each blade root can be brought as near as possible to the rotor axis and the number of rotor components can be reduced.

In another embodiment of the rotor according to the invention, the forked component mainly comprises a radially disposed yoke, the end of the fork further from the hub being secured to the corresponding blade root e.g. by two shafts substantially perpendicular to the rotor plane whereas the other end of the yoke comprises two rigid flat elements secured to one another, disposed on either side of the peripheral part of the hub without contact therewith and secured, e.g. by two bolts, to the holder of the corresponding spherical abutment; for example, the yoke mainly comprises two rigid plates secured to one another and substantially parallel to one another and to the spherical part of the flat annular rotor.

The last-mentioned embodiment is particularly advantageous in that it is specially suitable for constructing a rotor having foldable blades; to this end, it is sufficient if one of the shafts securing the yoke to the blade root is movable so that the blade can be folded in the rotor plane by pivoting around the other shaft securing the yoke. Since the yoke, inter alia the two rigid parallel plates forming it, can still be relatively short in the radial direction, the last-mentioned embodiment has practically the same advantages as the preferred embodiment.

Numerous kinds of rear rotors for helicopters are already known. Some have mechanical joints provided with ball, roller or needle bearings; in others, the flexibility of the blade-securing devices is used to allow the blades to beat and move in step. A rear rotor of the last-mentioned kind is described in French Patent Specification No. 2 315 432, filed on June 22, 1976. The rear rotor has four blades and inter alia comprises two flexible blade-shaped longitudinal members disposed perpendicular to one another, their central parts being held between two plates secured to the rotor shaft, the members forming the hub thereof. The rotor also comprises four sectional shells each surrounding half a longitudinal member, to which they are connected to so as form the four blades. However, although the longitudinal members are made of high-strength fibres coated with a synthetic thermosetting resin, their life is limited owing to the very high stresses to which they are subjected, mainly owing to the bending motion corresponding to the beat of the blades, and to torsion corresponding to the blade pitch control. In addition, the method in question of controlling the blade pitch requires considerable force during manoeuvring, which necessitates the use of servo-control systems, which are frequently duplicated for safety. Furthermore, damage to a single blade, inter alia to the corresponding part of the longitudinal member, will mean that the entire member (i.e. two blades) will have to be changed. Finally, the fact that the blades extend through the centre of the hub complicates the design of the conventional pitch control means using a central rod, since it is not advisable to convey the rod through an orifice in the central part of the blades, where they are subjected to high stresses. In such cases, as stated in Patent Specification No. 2 315 422, numerous precautions have to be taken in constructing the aforementioned part of the hub.

The rear helicopter rotor according to the invention does not have any of the aforementioned disadvantages.

Its blades are each coupled to the hub by a laminated spherical abutment having three degrees of liberty and are not subjected by the control forces to excessive stresses capable of reducing their life. There is a great reduction in the force which has to be applied to each blade to vary its pitch, since it has only to overcome the internal resistance of the corresponding laminated spherical abutment. When a rotor blade according to the invention is damaged, it can be replaced without another blade having to be replaced at the same time. Finally, it is still possible to recess the central part of a rear rotor hub according to the invention to provide a free passage for the pitch variation control device, which can thus be made simple, compact and light and adapted to be streamlined at the same time as the hub, in order to reduce the rotor drag. In spite of these advantages, the rear helicopter rotor according to the invention requires practically no maintenance, except for possible replacement of the laminated spherical abutments and trailing return braces after long use.

Another embodiment of the rotor according to the invention comprises a hub having a different, simpler and mechanically more rugged structure and also more compact, thus reducing the aerodynamic drag. The last-mentioned rotor according to the invention is characterised in that its hub has a central stem prolonging the rotor strut and bearing a top plate and a bottom plate, one rigid component of each laminated spherical abutment is fitted between and directly secured to the edges of the two plates to form a rigid cross-member, the root of each blade is secured to the other rigid component of the corresponding spherical abutment by a radially-disposed yoke which is recessed to provide a free passage for the spherical abutment, and the first and the second end of each trailing return brace are coupled by ball joints, the first end to the yoke associated with the corresponding blade and the second end to a suitable place on the central stem of the hub.

Since the top and bottom plates of the rotor hub according to the invention are not recessed to provide a free passage for spherical abutments, and since their respective edges are braced by the rigid components of the spherical abutments, inserted between them, the hub plates have excellent mechanical resistance to the mainly radial tensile forces resulting from the centrifugal force on each blade, and also to the static and dynamic bending moments of beat and drag, exerted by the rotating blades on the means connecting them to the hub.

In the last-mentioned embodiment, the top and bottom hub plates are preferably thin and the bottom surface of the bottom plate has e.g. radial reinforcing ribs. The last-mentioned advantageous feature enables a reduction to be made in the weight and cost of the rotor hub according to the invention without reducing its mechanical strength.

By way of example, a number of embodiments of the rotor according to the invention are described hereinafter and diagrammatically illustrated in the accompanying drawings, in which:

FIG. 1 is a plan view of a blade root of a main helicopter rotor according to the invention, showing the part of the rotor hub to which the blade root is coupled;

FIGS. 2 and 3 are sectional views along lines II—II and III—III of FIG. 1 respectively;

FIG. 4 is a plan view of another embodiment of a main helicopter rotor having four blades foldable in the rotor plane;

FIG. 5 is a section along line V—V of FIG. 4;

FIG. 9 is a partial view of the same embodiment in section along line IX—IX of FIG. 8;

FIG. 10 is an exploded view of the recessed yoke which, in FIGS. 8 and 9, connects the blade root to the corresponding spherical abutment;

FIG. 12 is a section, corresponding to FIG. 9, of another embodiment of the rotor according to the invention, and FIG. 13 is a perspective view of the cross-member forming part of the recessed yoke in the embodiment illustrated in FIG. 12.

Figure 6:
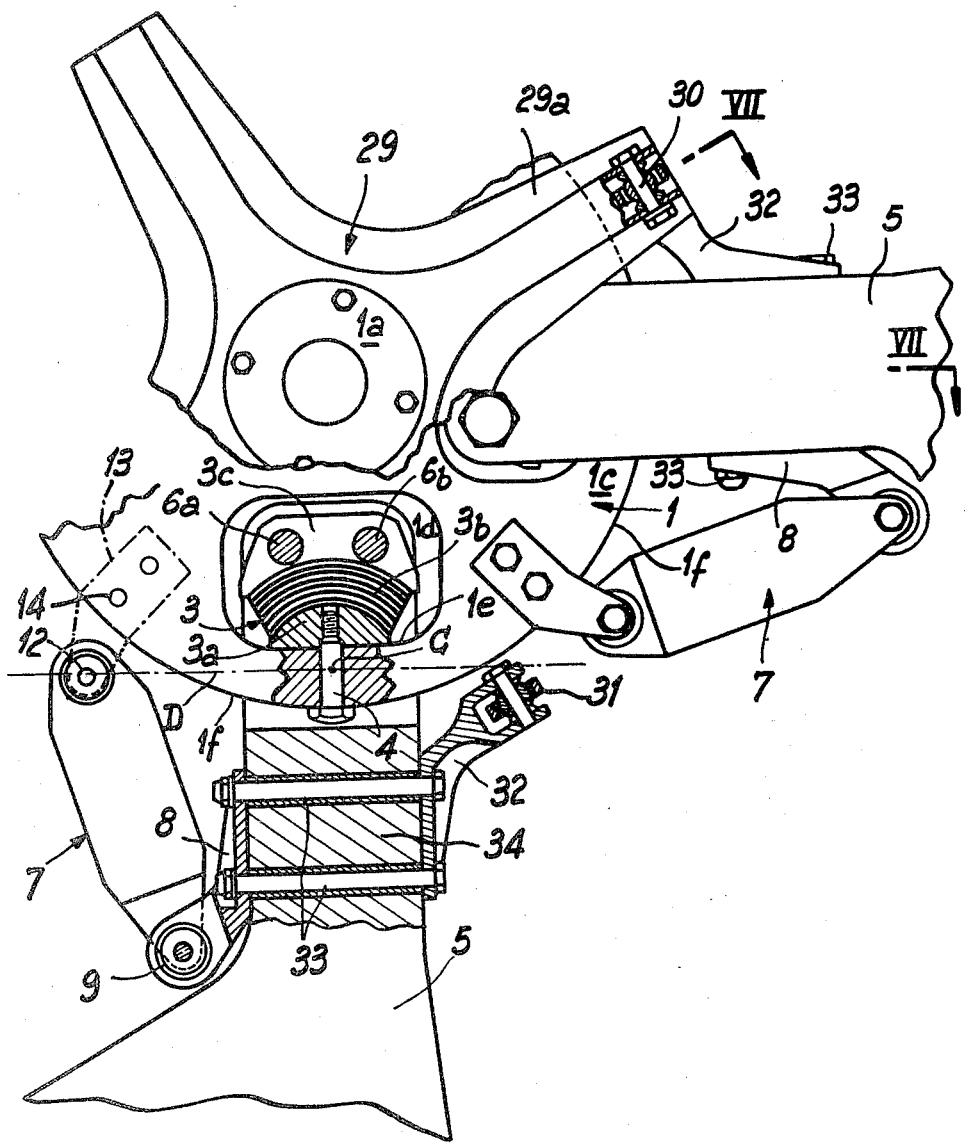
FIG. 6 is a partly cut-away front elevation of a rear helicopter rotor according to the invention.

FIGS. 1-3 are diagrammatic, partial illustrations of a main helicopter rotor of the four-blade kind. It comprises a one-piece hub 1 constructed as follows: its central part 1a is symmetrical in revolution around the rotor axis A. The central hub part 1a, together with the top part 2 of the tubular strut of the rotor, to which it is connected by a frusto-conical part 1b, forms a single metal component, which is e.g. machined from a forged blank, inter alia of steel or titanium to reduce weight. The peripheral part 1c of hub 1 is substantially circular (as shown at 1f in FIG. 1) and is likewise in one piece with its central part 1a and with the rotor strut 2; the hub has a peripheral part 1c in the form of a flat ring which, in the direction of the rotor shaft A, is formed with a number of apertures 1d equal to the number of rotor blades, i.e. four in the present case. Each aperture, which in plan view can have the shape shown in FIG. 1, has an outer edge 1e in a plane parallel to axis A and extends in the radial direction of hub 1 from the central part 1a up to a short distance d from the substantially circular periphery 1f of part 1c. Owing to the aforementioned structure, the assembly formed by strut 2, central part 1a and peripheral part 1c has high mechanical resistance, more particularly to centrifugal tension and the bending stresses applied to part 1c, whereas its weight is much less than that of the prior-art hubs, which are completely rigid and usually of metal.

A known laminated spherical abutment (general reference 3) is mounted on the outer edge 1e of each aperture such as 1d through the peripheral part 1c. In the embodiment under consideration, the laminated abutment, which has a geometrical centre C, comprises a metal core in the form of a convex spherical cap 3a, made e.g. of titanium or aluminium alloy and comprising two lugs engaging one above and one below the peripheral region 1c between aperture 1d and the circular edge 1f (FIG. 1). The lugs of core 3a are connected to part 1c by a bolt 4 and a nut (FIG. 3). Abutment 3 also has a rigid metal holder 3c made of the same metal as core 3a and having an internal surface in the form of a concave spherical cap. FIG. 3 clearly shows the shape of holder 3c in cross-section through a radial plane of hub 1. A stack 3b of rigid metal caps in the form of portions of concentric spheres alternating with layers of elastomer is disposed between the convex spherical surface of core 3a and the concave spherical surface of holder 3c. The assembly comprising core 3a, holder 3c and stack 3b can be secured together by vulcanization to form a body which transmits axial pressure but is resiliently deformable by shearing the elastomer layers in stack 3b so that core 3a can rotate relative to holder 3c. A conical axial recess 3e is formed in stack 3b to correspond with cylindrical holes 3f and 3g formed in core 3a and holder 3c. Recess 3e and holes 3f, 3g are for inserting the elastomer between the metal components by casting it under pressure before the assembly is vulcanized.

Each of the four blades, e.g. 5, of the rotor illustrated in FIGS. 1–3 can have an appropriate internal construction, e.g. can be made of synthetic or mineral fibres coated and secured together by a synthetic thermosetting resin, the fibres being embedded in layers of cloth impregnated with a synthetic resin by a known method. The invention is not limited to the last-mentioned embodiment of the blades, but it specifies that the holder 3c of each spherical abutment such as 3 is mounted between the ends of the arms 5a, 5b of a forked component secured to the root of the corresponding blade 5. More specifically, in the embodiment illustrated in FIGS. 1–3, the forked component is a prolongation 5a–5b of the root of blade 5, the ends of arms 5a, 5b being respectively secured to the top and bottom end of holder 3c, inter alia by two bolts 6a, 6b each extending through rings engaging in aligned apertures in the end of the two arms 5a, 5b of the root of blade 5 and in an aperture in holder 3c, the bolts being secured by nuts such as 6c (FIG. 3).

According to the invention, a resilient trailing return brace 7 (FIG. 1) is associated with each blade 5. As shown in FIG. 2, each brace 7 comprises a stack of metal plates 7a–7c alternating with plates 7d, 7e of a viscoelastic material having great persistence of derformation. Plates 7a–7c are secured together by vulcanization or sticking. One end of each brace 7 is directly coupled to the root of the corresponding blade 5 by an iron mounting 8 and a ball joint 9 mounted at the end of a prolongation of the internal metal plate 7b. The other end of each brace 7 is embodied in prolongations of the two outer metal plates 7a, 7c and secured by bolts 10a, 10b to a short yoke 11, which is coupled by a ball joint 12 to a component 13 secured by a bolt 14 to a place on the periphery of part 1c between the spherical abutment 3 associated with the blade 5 in question and the corresponding spherical abutment (not shown in FIG. 1) associated with the immediately preceding blade in the direction of rotation (indicated by arrow f in FIG. 1). In the embodiment under consideration, bolt 14 secures the internal end of brace 7 to the periphery of hub 1 at a place exactly on the bisector B of two radial axes $R_1$, $R_2$ perpendicular to one another and respectively defining the neutral position of blade 5 and the neutral position of the immediately preceding blade in direction f, i.e. the respective positions of the longitudinal axes of these blades when the rotor stops (drag angle $\delta=0$). However, it is not necessary for the internal end of each brace 7 to be secured in such a precise manner. In the aforementioned preferred embodiment, according to an advantageous feature of the invention, the centre of the ball joint 12 coupling each brace 7 to hub 1 is near the beat axis D of the corresponding blade 5, the axis extending through the axis C of the corresponding spherical abutment 3 as shown in FIG. 1. In the aforementioned case of a main rotor, the beat axis D is of course substantially horizontal.

A pitch control lever 15 is secured to the forked component 5a, 5b associated with the blade 5 on the side remote from the brace 7 associated with the same blade 5. In the embodiment illustrated in FIGS. 1–3, the pitch control lever 15 has two apertures 15a (FIG. 3) by means of which it is placed on the threaded ends of the aforementioned bolts 6a, 6b so as to be secured by nuts 6c against the end of the bottom arm 5b of the root of blade 5. According to another feature of the invention, the control end 15b of the lever for controlling the pitch of each blade is near the beat axis D of the corresponding blade 5 in the same manner as the aforementioned ball joint 12 but on the other side from joint 12 relative to the centre C of abutment 3.

Finally, the bottom arm 5b of the forked root of each blade 5, at its end near the rotor, has an abutment 16 disposed so as to limit the downward beat of blade 5 by co-operating with a reversible ring 17 (FIG. 3) mounted in known manner around the rotor strut below hub 1. In the embodiment shown in FIGS. 1–3, the metal abutment 16 forms a right-angle, one arm having apertures for the bottom ends of bolts 6a and 6b so that abutment 16 can be secured by nuts 6c against the end of the bottom arm 5b of the corresponding end of the pitch control lever 15. Ring 17 is likewise of metal and is mounted so that it can slide radially, with gentle friction, in a radial slot 18 in a component 19 secured to the periphery of strut 2. Component 19 can either be single, bounding an annular slot 18 having the appropriate radial depth, or alternatively a number of components 19 can be regularly spaced on the periphery of strut 2.

FIGS. 1–3 do not show the mechanism for simultaneously or separately controlling variations in the pitch of the various blades 5. The invention is not limited to a particular embodiment of such a mechanism, since several embodiments are known. It is sufficient to mention that the aforementioned mechanisms, via links, subjects the ends 15b of pitch control levers 15 to substantially vertical upward or downward forces, depending on the desired direction of the change in pitch.

When the rotor has stopped, simultaneous downward pivoting of the four blades is limited by their respective abutments 16 co-operating with ring 17, which is mounted so that it can slide radially. In the inoperative position, the longitudinal axis of each blade 5 is in the same vertical plane as the radial axis, e.g. $R_1$, the blade in question being in its neutral position ($\delta=0$).

When the rotor is driven in rotation via strut 2, the system of centrifugal forces applied to the various components of each blade 5 subjects the corresponding spherical abutment to a radial resultant along axis $R_1$, which is absorbed by the compression of the resilient body 3b of abutment 3. As a result of the various moments and aerodynamic and inertial forces acting on each blade, the blade assumes a beat equilibrium position owing to shearing deformation of body 3c around centre C. The driving torque is transmitted to each blade by compressing the associated brace 7 so that each blade 5 then occupies a "retarded" position in which its longitudinal axis L co-operates with the axis $R_1$ defining the neutral position of the blade to bound a drag angle $\delta$ which is substantially the same for all the blades.

Under normal rotor conditions, when the helicopter is flying in a straight line, any oscillations in the drag of each blade 5 will result in slight variations in the angle formed by axes L and R1 around the previously-defined value of angle $\delta$. They are largely absorbed by the action of plates 7d, 7e (FIG. 2), which are made of viscoelastic material having great persistence of deformation, the two plates forming the corresponding brace 7. Since ball joint 12, mounted at the internal end of brace 7, is near the beat axis D of blade 5, the beating motion of the blade around its axis D results only in negligible compressive or tensile stresses on brace 7, which therefore has only a negligible resilient return and shock-absorbing effect on the beat of blade 5. The same applies, for the same reason, to the substantially vertical movement of the end 15b of the pitch control lever 15 associated with each blade 5.

When the rotor is at rest, the brace 7 associated with each blade 5 returns to its original length and shape by subjecting the root of blade 5 to a return force which brings it back to its previously-defined neutral position ($\delta = 0$), the downward sag of the blade being again limited by ring 17.

FIGS. 4 and 5 show a four-blade rotor according to the invention which is likewise a main helicopter rotor but is constructed so that the blades can be folded when the helicopter is parked.

In FIGS. 4 and 5, references corresponding to those in FIGS. 1-3 are used for corresponding components which will not have to be described in detail. We shall therefore only describe those features of the embodiment in FIGS. 4 and 5 which differ from the previously-described embodiment illustrated in FIGS. 1-3.

As in the previously-described embodiment, each spherical abutment 3 is mounted between (a) the outer edge 1e of the aperture 1d in the direction of rotor axis A through the peripheral part 1c of hub 1 and (b) the ends of the arms 20a, 20b of a forked component secured to the root of the corresponding blade 5. In FIGS. 4 and 5, however, the forked component 20a, 20b mainly comprises two rigid plates 20a, 20b substantially parallel to one another and to the peripheral part 1c of the rotor, which is in the form of a flat ring. As shown in FIG. 5, plates 20a, 20b are disposed on either side of the peripheral part 1c of hub 1 without contact therewith, and are also secured to holder 3c of abutment 3 by two bolts 6a, 6b. The other ends of the two parallel plates 20a, 20b are secured to the root of the corresponding blade 5 by two shafts 21a, 21b, at least one of which, e.g. 21a, is movable. The shaft is e.g. a tubular shaft engaging with gentle friction in matching apertures in the outer ends of the two parallel plates 20a, 20b and the root of blade 5. Shaft 21a is normally secured in the aforementioned apertures, e.g. by a metal wire clip 22 which can be removed in order to take out the shaft 21a, after which blade 5 can be folded by pivoting around the fixed shaft 21a in the direction of arrow F (FIG. 4) towards the rear of the helicopter into the parking position. Of course, this can be done only after uncoupling strut 7 of blade 5 at the iron mounting 8.

The aforementioned embodiments of a main helicoptor rotor can be modified in various ways, all within the framework of the invention. The rotor hub according to the invention, instead of forming a single metal component with strut 2, can have a composite structure which, in known manner, mainly comprises a stack of cloth layers coated and secured together by a hardened synthetic resin, the cloth being made up of synthetic or mineral fibres having high mechanical strength. Use can be made e.g. of glass fibre or synthetic fibre cloth commercially known as Kevlar, or carbon fibre cloth, which is even stronger and considerably less dense, which is advantageous in further reducing the weight of the rotor hub according to the invention. Although composite structures of the aforementioned kind have hitherto been used to make semi-rigid or partly flexible rotor hubs, it is also possible to construct similar composite structures which are very rigid in order to form the rotor hubs according to the invention. Of course, a hub having a composite structure of the aforementioned kind must be secured by any appropriate means, e.g. bolts, to the top end of the rotor strut, which is usually a hollow metal shaft. Similarly, in the case of a foldable-blade rotor of the kind illustrated in FIGS. 4 and 5, the two plates 20a, 20b can either be of metal or have the previously-described composite structure of hub 1. The two plates 20a, 20b for coupling the root of each blade 5 to the corresponding spherical abutment 3 can likewise be replaced by a forked component having a different shape, e.g. a radially disposed yoke, whose end remote from the hub is secured to the corresponding blade root by two shafts substantially perpendicular to the plane of the rotor, one shaft being preferably movable so that the blade can be folded by pivoting around the other shaft, whereas the other end of the yoke comprises two flat rigid components disposed one on each side of the peripheral part of the hub without contact therewith, and secured to the holder of the corresponding spherical abutment, e.g. by two bolts. As previously stated, the peripheral part 1c of hub 1 according to the invention is a flat ring; its periphery 1f can be substantially circular as in FIG. 1, but with gaps on either side of the places 14 where braces 7 are secured, or can be a preferably regular convex polygon as in FIG. 4. Thus, the rotor hub according to the invention is very markedly different from the star-shaped hubs, i.e. having a concave polygonal periphery, mentioned in the description of the prior art.

Figure 7:
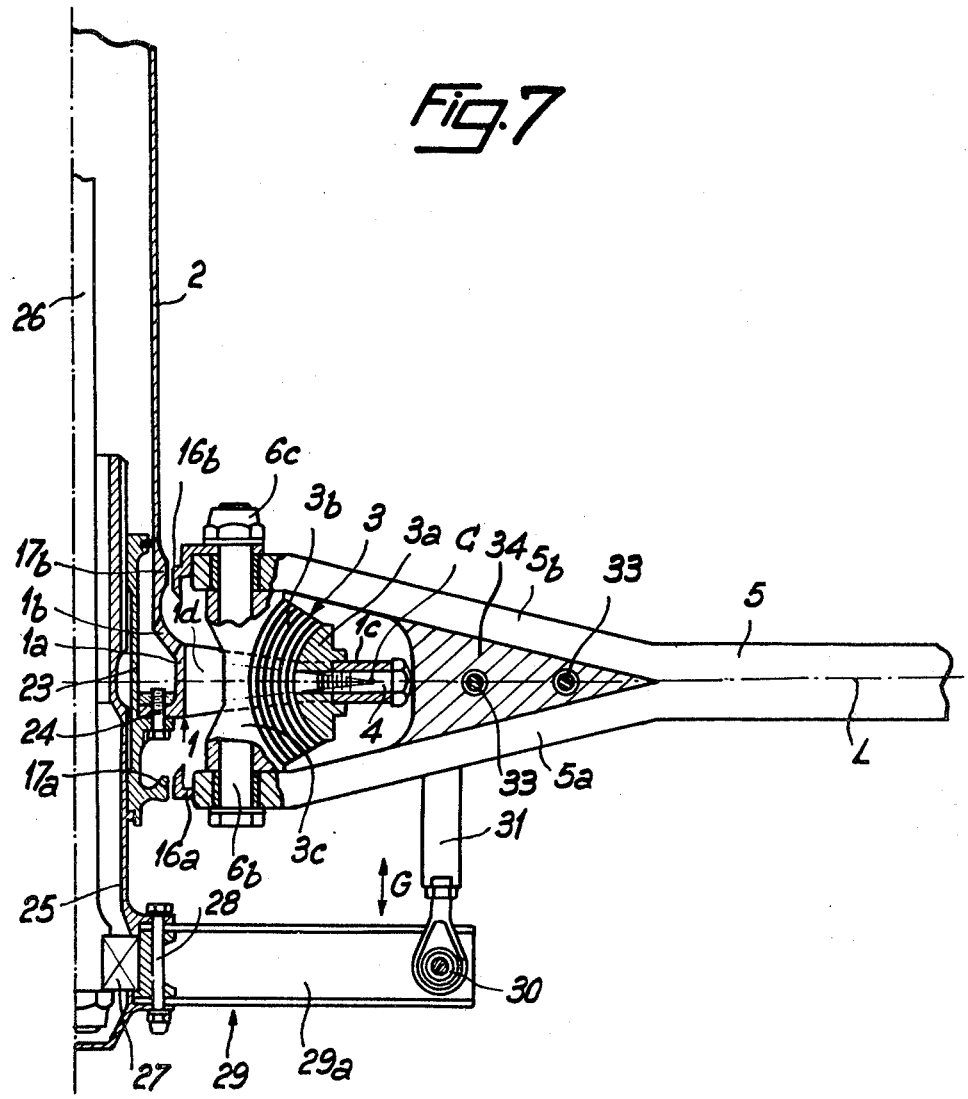
FIG. 7 is a section along line VII—VII of FIG. 6.

FIGS. 6 and 7 illustrate a rear helicopter rotor according to the invention which does not differ from the main rotor illustrated in FIGS. 1-3 and previously described except in the following particulars: Core 3a of each abutment 3 is secured to the peripheral part 1c by a single radial bolt 4. A tube component 23 having an outer diameter less than the internal diameter of strut 2 fits in the hollow central part 1a of hub 1, to which it is secured by bolts 24. A tube 25 which is longer than component 23 but has a smaller diameter is mounted so that it can slide freely in component 23, e.g. along longitudinal grooves. A non-rotary pitch control shaft 26 is mounted along the axis of tube 25. Their (?) front ends, disposed in front of blades 5, are coupled together by an abutment ball bearing 27. A star-shaped component 29, technically known as a "spider", is secured by bolts 28 to the periphery of the front end of tube 25. Component 29 has a number of arms 29a equal to the number of blades 5, and the end of each arm 29a is coupled to the forked component 5a, 5b prolonging the root of blade 5 by a transmission comprising a spherical ball joint 30, a link 31 and an iron mounting 32 secured to the forked component 5a-5b by the same bolts 33 which, on the other side of blade 5, secure the mounting 8 for holding the brace 7 associated with the same blade 5 (see FIG. 6). Bolts 33 extend through a wedge-shaped component 34 made e.g. of thermosetting synthetic resin filled with glass fibres and having triangular surfaces against which the mountings 8 and 32 bear.

According to the invention, the two arms 5a, 5b of each forked component such as the foot of blade 5, illustrated inter alia in FIG. 7, have abutments 16a, 16b at their ends near strut 2, the abutments being disposed so as to limit the beat of the corresponding blade 5 on either side of the substantially vertical plane of the rear rotor, by co-operating with respective abutments, i.e. an abutment 17a secured to the tubular element 23 prolonging the strut 2 in the direction of the pitch control device 29, and an abutment 17b secured to strut 2 and projecting from the outer wall thereof in the form of either one annular projection or a number of radial projections disposed opposite the roots of the respective blades.

As in the case of the aforementioned main rotors, each spherical abutment 3 of the rear rotor allows trailing movements of limited amplitude by the corresponding blade 5, a shock-absorption effect and a resilient return force being exerted by the corresponding brace 7. Abutment 3 also allows a beat of limited amplitude on either side of the substantially vertical plane of the rear rotor, by abutments 16a, 16b co-operating with abutment 17a, 17b respectively. The variations in the pitch of the rear rotor are servo-controlled by axially sliding shaft 26 in one or the other direction, along the common axis of tubular elements 2, 23 and 25, so as to move the spider 29 as indicated by the double arrow G, whereas component 29, via bearing 27, can be driven in rotation by rotor blades 5 and components 32, 31, 30. As can be seen, the last-mentioned components convert each sliding motion of spider 29 in one of the directions of the double arrow G into pivoting of the corresponding blade 5 around its longitudinal axis L. The pivoting is allowed, with limited amplitude, by the deformation of body 3b around the radial axis through its centre C, body 3b exerting only a weak return torque on the blade and also absorbing the resultant of the centrifugal forces applied thereto.

The rear helicopter rotor according to the invention has the following advantages. The dynamic beat and drag torques applied to the various blades 5 are greatly reduced, thus reducing the alternating stresses which they undergo and considerably lengthening their life; if a blade in the rear rotor is damaged, it can be individually replaced, unlike the case of prior-art rear rotors of the kind comprising a longitudinal member extending from one end of a blade to the end of the exactly opposite blade. The brace 7 associated with each blade 5 can be secured to the root of the corresponding blade by the same components, inter alia the same bolts 33, as the mounting 32 by means of which the pitch control device 29, 30, 31 actuates the blade root. As shown in FIG. 6, the place 14 where each brace 7 is secured to edge 1c of hub 1 and the control end of mounting 32 are near the beat axis D of the corresponding blade 5, which extends through the centre C of its spherical abutment 3. Furthermore, in contrast to the prior-art rear rotors, wherein each pair of blades is held by a single longitudinal member, the rear rotor hub according to the invention has a hollow central part 1a and is easy to mount and the dimensions and weight of the pitch conrol device 25, 26, 29 can be reduced by taking advantage of the wide cylindrical duct through the tubular strut 2 and the tubular element 23 in the central hollow part 1a of hub 1. The last-mentioned feature also enables hub 1 and spider 29 to be streamlined in a single operation, so as to reduce the drag of the rear rotor according to the invention. The rear rotor according to the invention also has reduced mass and is cheaper to manufacture, and maintenance is reduced to the replacement, where necessary, of the laminated spherical abutments and resilient return trailing braces after a long service life (on average greater than 2,000 hours). Finally, the force required for varying the pitch of each rotor blade according to the invention is relatively small, owing to the weak return torque produced by the laminated spherical abutment. Consequently the invention can obviate the use of a double servo-control device and a single servo-control device can, in economically advantageous manner, be used for the rear rotor. If the single servo-control fails, the control forces required for continued flight are so weak that the pilot, without excessive effort, can actuate the rudder bar controlling the pitch of the rear rotor.

Some of the previously-described embodiments of main rotors according to the invention are also applicable to rear rotors according to the invention.

Figure 8:
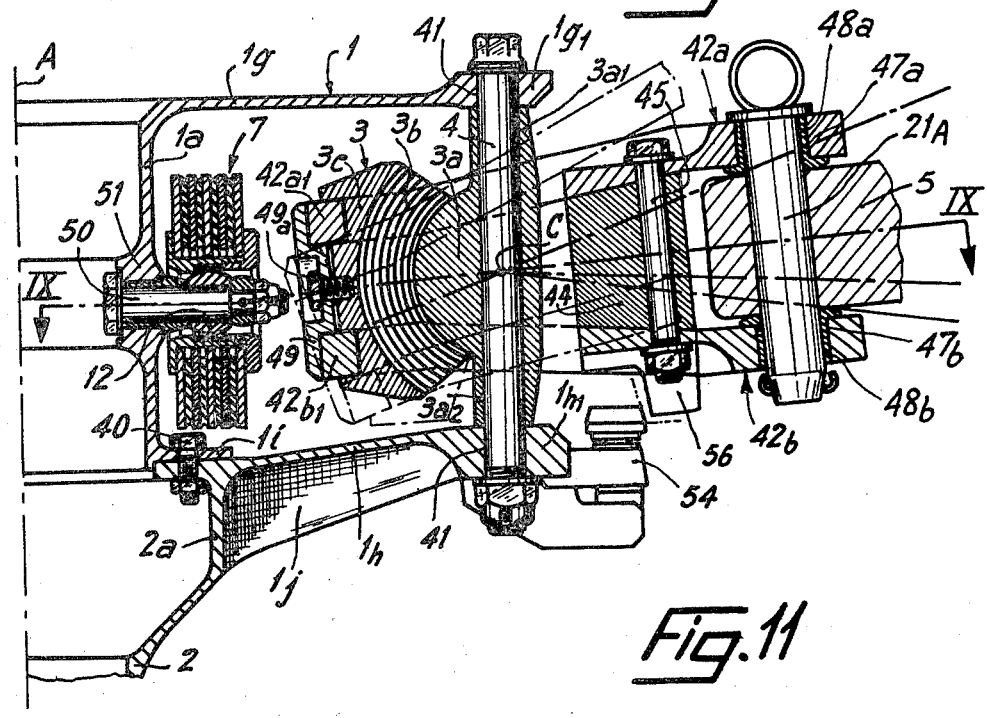
FIG. 8 shows part of another embodiment, in section through an axial plane through the hub extending along the longitudinal axis of one blade.

FIGS. 8–10 are partial diagrammatic views of a main helicopter rotor of the four-blade kind. It comprises a rigid hub 1 constructed as follows: its central part 1a comprises a tubular stem having a diameter near that of the rotor strut 2. The central stem 1a is secured to a top plate 1g whereas the top part 2a of the rotor strut is secured to a bottom plate 1h having an internal edge to which an annular flange 1i, formed on the outside of the bottom part of stem 1a, is secured e.g. by a ring of bolts 40. As shown in FIG. 9 plate 1h has the shape substantially of a star having four arms and the same applies to the top plate 1g, the assembly being disposed so that the respective arms of plates 1g and 1h have the same dimensions and are exactly superposed. As shown in FIG. 8, each plate 1g and 1h is thin, i.e. has nearly the same thickness as the wall of the tubular stem 1a, and the ends of the arms have thick portions 1gl or 1hl formed with two pairs of substantially superposed holes 41. The arms of plates 1g, 1h are e.g. dimensioned so that the axes of the pairs of holes 41 are substantially parallel to axis A of hub 1 and of rotor strut 2, and are at a distance from axis A which is e.g. between 3 and 4 times the radius of stem 1a. As shown in FIG. 8, the bottom surface of the bottom plate 1h is reinforced by radial ribs 1j. The assemblies formed by (a) the rotor strut 2 and the bottom plate 1h and (b) the tubular shank 1a and the top plate 1q, can either each form a single metal component, e.g. moulded, or can have a composite structure, mainly comprising a stack of layers of cloth coated and secured together by a hardened synthetic resin, the cloth being made up of synthetic or mineral fibres having high mechanical strength as stated previously.

A known laminated spherical abutment (general reference 3) is mounted between the ends of each pair of superposed arms of plates 1q and 1h. In the embodiment under consideration, abutment 3 (the geometrical centre of which is denoted by C) has a metal core 3a in the form of a convex spherical cap, made e.g. of titanium or aluminum alloy and integral with a holder comprising a top part 3a1 and a bottom part 3a2 for fitting between the ends of the corresponding arms of plates 1q and 1h. At the sides, the holder has two apertures which can be made to coincide respectively with the two pairs of holes 41 in the ends of the superposed arms of plates 1q and 1h, where the bolts 4 can be engaged, thus directly securing abutment 3 via the rigid element 3a to the edges of the two plates 1q, and 1h of hub 1. Abutment 3 has another rigid element 3c, made e.g. of the same metal as core 3a and the associated holder, the internal surface of component 3c being in the form of a concave spherical cap. A stack 3b of rigid metal caps in the form of portions of concentric spheres alternating with layers of elastomer is disposed between the convex spherical surface of core 3a and the concave spherical surface of element 3c. The assembly comprising core 3a, component 3c and stack 3b can be joined together by vulcanization or another process of sticking, as previously stated.

According to the invention, the root of each of the four blades 5 of the rotor illustrated in FIGS. 8 and 9 is secured to the rigid element 3c of the corresponding abutment 3 by a radially disposed yoke which is recessed to provide a free passage for abutment 3. In the embodiment in question, the yoke (an exploded view of which is given in FIG. 10) comprises two rigid plates 42a, 42b recessed at 43a, 43b respectively to provide a free passage for abutment 3, and a cross-member 44 secured between plates 42a, 42b e.g. by three bolts 45 extending through matching apertures 46a in plate 42a, 46 in cross-member 44 and 46b in plate 42b. As shown in FIGS. 8–10, cross-member 44 is thus secured in the space between recesses 43a, 43b in two plates 42a, 42b on the one hand and the ends of the plates remote from hub 1, which are also formed with pairs of matching apertures 47a or 47b. As shown inter alia in FIG. 8, the root of the corresponding blade 5 engages with slight clearance between the aforementioned ends remote from hub 1 of the two plates 42a, 42b. The three components (42a, 5 and 47b) are secured together by two shafts 21A and 21B; the shafts extend in directions substantially perpendicular to the rotor plane through the two pairs of apertures 47a, 47b in the two rigid plates 42a, 42b, provided with rings such as 48a, 48b, and through the corresponding apertures in the root of blade 5. At least one of the two shafts, e.g. 21A, is preferably removable so as to fold blade 5 in the rotor plane by pivoting around the other or fixed shaft 21b as previously described. As shown inter alia in FIG. 8, the ends 42a1 and 42b1 nearer hub 1 of plates 42a, 42b are partly fitted into corresponding gaps in the rigid component 3c of abutments 3, to which ends 42al and 42bl are secured by a plate 49 which in turn is secured to component 3c by screws 49a in the space between the aforementioned gaps.

In the last-mentioned embodiment, the cross-member 44 secured between plates 42a, 42b of the yoke is prolonged beyond the yoke, on the same side as the leading edge of blade 5 (i.e. in the direction of rotation of the rotor indicated by arrow f in FIG. 10) by a bent continuation 44a; as shown inter alia in FIGS. 9 and 10, continuation 44a starts in a recess 44b open on the side of hub 1, having two side walls formed with apertures 44b1 and 44b2 aligned along an axis D extending through the centre C of abutment 3, which is preferably in the same plane as the axes of the screws 4 securing abutment 3 to the hub plates 1g and 1h. Beyond recess 44b, the continuation 44a of cross-member 44 bears a yoke 44c having two lugs formed with holes 44c1 and 44c2 aligned along an axis E substantially perpendicular to axis D.

According to the invention a resilient trailing return brace 7, preferably constructed as previously described, is associated with each rotor blade 5 as follows: The first end of brace 7 (i.e. furthest from hub 1) is coupled by a ball joint 9 to a shaft 49 extending through the recess 44b of the bent continuation 44a and the apertures 44b1 and 44b2 in its walls, to which the ends of shaft 49 are connected by any appropriate means. The second end of brace 7 (i.e. nearer hub 1) is coupled to the tubular stem 1a of hub 1 by a ball joint 12 secured by a bolt 50 in an annular region 51 of stem 1a, where the wall of stem 1a is internally thickened as shown in FIG. 8. In the embodiment shown, the ball joint 12 coupling the second end of brace 7 associated with a blade 5 is secured to stem 1a at the yoke associated with the immediately preceding blade in the direction of rotation of the rotor (f in FIG. 10), in the space between stem 1a and the yoke.

A shaft 52 engages in the two holes 44c1 and 44c2 of yoke 44c of cross-member 44 and is secured by any appropriate means and acts as a pivot for the end 15b of the pitch control lever of the corresponding blade 5. Like ball joint 9, end 15b is coupled to the bent continuation 44a near the axis D extending through the centre C of the spherical abutment 3.

As shown at the bottom of FIG. 8, the edge of the bottom plate 1h of hub 1 bears an abutment 54 at each blade 5, i.e. at the end of the corresponding arm of plate 1h. Abutment 54 is of a known kind and can be retracted in flight, e.g. by centrifugal force. The bottom surface of the rigid plate 42a also has a projection 56 which can co-operate with the retractable abutment 54 when the abutment is in the operating position and the rotor is stationary or rotating slowly.

When the rotor is stationary the four blades pivot simultaneously downwards because of their weight, but the motion is limited by abutments 56 of the respective yokes, inter alia on the bottom plate 42b, which co-operate with the corresponding abutment 54, which is then in the operating position.

When the rotor is driven in rotation via strut 2, the system of centrifugal forces applied to the various components of each blade 5 subjects the corresponding spherical abutment 3 to a radial resultant which is absorbed by compressing the resilient body 3b of abutment 3. In addition, as a result of the various aerodynamic forces and moments and the inertia on each blade, the blade takes up a beat equilibrium position as a result of shearing deformation of the resilient body 3c around centre C of abutment 3. The driving torque is transmitted to each blade by the associated brace 7, which is thus slightly stretched, so that the position of blade 5 is slightly behind its neutral position, when the rotor is at rest.

When the rotor is operating normally and the helicopter is flying straight, the drag oscillations of each blade 5 are mostly damped by the resilient return brace 7 as previously described. Ball joint 9, at which the first end of brace 7 is coupled to the root of the corresponding blade 5 via cross-member 44 and its continuation 44a, is near axis D extending through the centre C of abutment 3, which constitutes the beat axis of blade 5. Consequently the beat motion of blade 5 around its axis D produce negligible compressive or tensile stresses on brace 7, and consequently brace 7 has a negligible resilient return and damping effect on the beat of blade 5. The same applies to the substantially vertical motion of end 15b of the pitch control lever associated with blade 5, since end 15b is pivoted on shaft 52 near the beat axis D of blade 5. In addition, since abutments 54 are then retracted as a result of centrifugal force, the downward beat of blades 5 is not limited during normal operation.

When the rotor stops, the brace 7 associated with each blade 5 returns to its normal length and shape by subjecting the root of blade 5 to a return force which brings it into the neutral position, whereupon the downward sag of the blades is again limited by abutments 54, which return to the operating position when the rotor speed falls below a given value.

Figure 11:
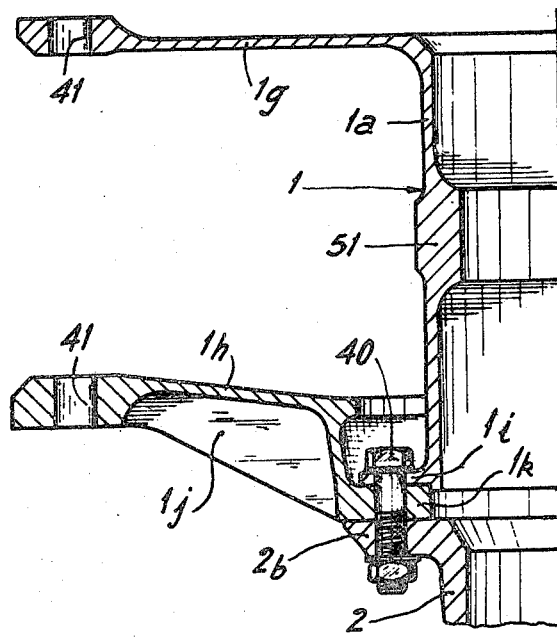
FIG. 11 illustrates a variant of the hub shown in FIG. 8.

Part of a variant of the rotor hub 1 illustrated in FIGS. 8–10 is shown in FIG. 11, in which like references have been used to denote like components. In FIG. 11, the top plate 1g of hub 1 is as before secured to its central stem 1a, but the bottom plate 1h is an independent component from the top part of the rotor strut 2. The three components 1a, 1h and 2 are assembled by means of their respective annular flanges 1i, 1k and 2b, using a ring of bolts 40.

FIGS. 12 and 13 diagrammatically show another embodiment of the invention, likewise using the same references for like components as in FIGS. 8–10. The last-mentioned embodiment is identical with the previously-described embodiment except in the following points. Cross-member 44, which is secured between the two plates 42a, 42b of the yoke associated with each blade 5, is prolonged by a first bent continuation 44a1 beyond the yoke on the leading-edge side of balde 5, i.e. in the direction of arrow f indicating the direction of rotation in FIG. 12, whereas member 44 is prolonged by a second bent continuation 44a2 on the trailing-edge side. Continuation 44a1 has only two lugs 44c, perforated at 44c1 and 44c2 respectively for securing the pivot 52 of the end 15b of the pitch control lever of the corresponding blade. The second bent continuation 44a2 is formed with a recess 44b extending all the way through shaft 49 securing the ball joint 9 associated with the first end of brace 7 corresponding to blade 5. In the last-mentioned embodiment, therefore, each resilient trailing return brace 7 is on the trailing-edge side of the corresponding blade, and is thus slightly compressed during normal rotor operation. As in the preceding embodiment, end 15b and the pivot 9 of the first end of the associated return brace 7 are near the beat axis D of blade 5, with the previously-mentioned results.

The embodiment of the retractable abutments 54 is optional, and the same applies to the manner of constructing the cross-members 44 illustrated in perspective in FIGS. 10 and 13. Instead of comprising a single cross-member simultaneously bearing the pivot of the end of the pitch control lever and the ball joint of the first end of the resilient return brace, the yoke associated with each rotor blade according to the invention could comprise two independent cross-members for separately performing the two functions of the single previously-described cross-member. Instead of being formed by two rigid plates 42a, 42b connected by at least one cross-member 44, the yoke for connecting the root of each blade 5 to the corresponding abutment 3 could be differently constructed, e.g. in the form of a single moulded or machined component formed with a suitable recess providing a free passage for abutment 3. The yoke may likewise be secured to and integral with the root of the corresponding blade 5. This last embodiment is simpler mechanically but of course would not allow the blades to fold. The method of securing the ends nearer the hub of the yoke plates 42a, 40b is optional, and the same applies to the construction of the spherical abutment 3. The reinforcing ribs 1j of the bottom plate 1h can be omitted if the bottom plate is sufficiently thick. Alternatively the hub assembly, inter alia the central stem 1a and plates 1g and 1h can co-operate with the top part of the rotor strut 2 to form a single component, made e.g. by moulding.

What I claim is:

1. A rotary aircraft rotor comprising a hub arranged for rotation about a rotor axis and supporting a plurality of rotor blades presenting each a root,
   said hub being formed in the direction of the number of blades,
   and being coupled to the root of each blade by means of a laminated spherical abutment mounted between an outer edge of the corresponding aperture and inner ends of two arms of a forked component intergral with the corresponding blade root, and having a center through which extends the blade beat flap axis,
   and of a resilient trailing return brace comprising an elongated stack of metal plates alternating with elastomeric shock-absorbing plates made of visco elastic material having great persistence of deformation, a first extremity of said brace being coupled to the corresponding blade root,
   wherein said rotor hub is a rigid one-piece hub having a peripheral part in form of a flat ring, the periphery of which is of the type comprising convex polygonal and substantially circular peripheries,
   said apertures being formed in said hub peripheral part, and each of said braces having two extemities each equipped with a ball-joint via which said first extremity is coupled to the corresponding blade root and the second extremity is coupled to a place on the hub periphery between the laminated sperical abutment of the corresponding blade and the laminated sperical abutment of an immediately neighbour blade
   said ball joint of said second brace extremity having its center near the beat flap axis of the corresponding blade.

2. A rotor as in claim 1, wherein a pitch control lever is secured to each forked component on the side remote from the brace of the corresponding blade, and has a free end near the beat flap axis of said corresponding blade.

3. A helicopter rear rotor as in claim 2, wherein said two arms of each formed component have abutments disposed at their inner ends and limiting the beat of the corresponding blade on either side of the rotor rotation plane by co-operating with respective abutments, one of which is secured to a rotor strut fixed to a hollow central part of said rigid hub and the other secured to a tube component partly extending in said strut and said hub hollow central part and partly extending in the prolongation thereof.

4. A helicopter rear rotor as in claim 3, wherein a non-rotary pitch control shaft extends coaxially in a slide tube coaxially mounted in said tube component, said pitch control shaft and said slide tube having end parts in the prolongation of said tube component and coupled together through an abutment ball bearing, the end part of said slide tube carrying a star shaped component having for each blade an arm extending in a plane perpendicular to said slide tube, said arm presenting a free end coupled to the free end of the corresponding pitch control lever through a link.

5. A rotor as in claim 2, wherein said forked components are each a prolongation of the corresponding blade root, and said ends of its arms are secured by two bolts to a rigid holder presenting a concave spherical cap of the corresponding laminated spherical abutment.

6. A rotor as in claim 2, wherein said forked components each mainly comprises a radially disposed yoke the outer end of which is secured to the corresponding blade root whereas the inner end of which comprises two rigid flat elements secured to one another, disposed on either side of said peripheral part of the hub without contact therewith, and secured to a rigid holder presenting a concave spherical cap of the corresponding laminated spherical abutment.

7. A rotor as in claim 6, wherein each yoke is made of two rigid plates substantially parallel to one another and to said peripheral part of the hub, and secured to the corresponding blade root by two shafts substantially perpendicular to said plates.

8. A rotor as in claim 7, wherein one of said shafts is removable to allow the folding of the corresponding blade in the rotor rotation plane by pivoting around the other shaft.

9. A rotor as in claim 2, wherein said inner end of the bottom arm of each said forked component has an abutment limiting the downward beat of the corresponding blade when cooperating with a reversible ring slidably mounted in radial direction around a rotor strut on the upper part of which said rotor hub is fixed.

* * * * *